Aug. 22, 1933.  R. E. HEDBERG  1,923,200
SEPARATING DEVICE
Filed May 6, 1930
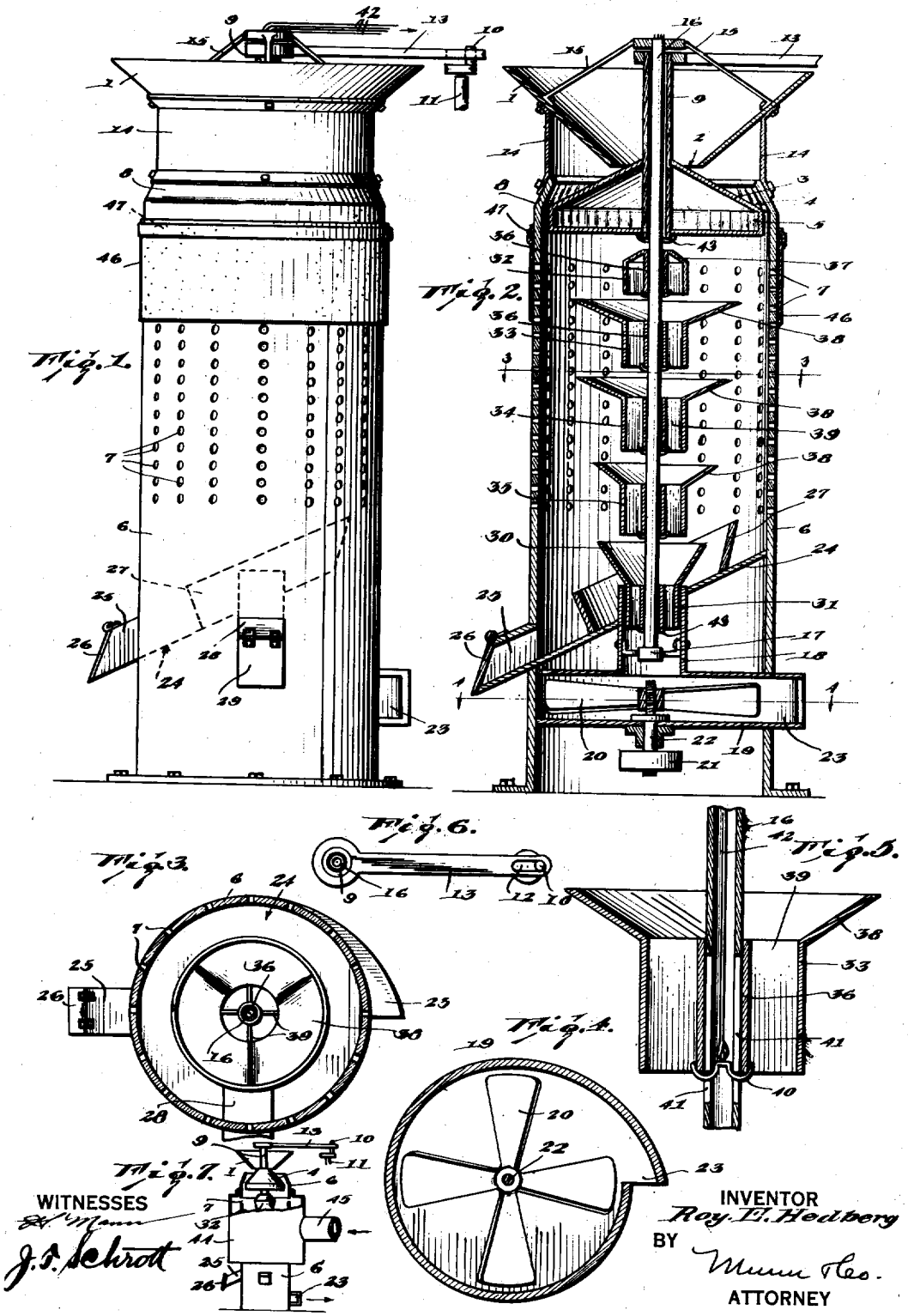
INVENTOR
Roy E. Hedberg
BY
ATTORNEY
WITNESSES Patented Aug. 22, 1933

1,923,200

UNITED STATES PATENT OFFICE 1,923,200

SEPARATING DEVICE

Roy E. Hedberg, Grenfill, Saskatchewan, Canada

Application May 6, 1930. Serial No. 450,254

3 Claims. (Cl. 209—150)

This invention relates to improvements in separating devices and it consists of the constructions, combinations and arrangements herein described and claimed.

An object of the invention is to provide a separating device, intended in this particular instance for the separation of seeds of various kinds but capable of use for separating other granular substances of differing densities, in which device a current of air is directed against the moving substance to cause different degrees of deflection of varying constituents thereof in agreement with their weight, so that each will be caused to reach separate compartments.

Another object of the invention is to provide a separating device in which a current of air at a substantial uniform velocity is directed against a sheet of the falling substance to be separated so that its constituents will be deflected to degrees depending upon their weight, the extent of deflection therefore increasing with the successive decreases in weight of the constituents.

A further object of the invention is to release a substance so that it can move toward separating compartments by gravity but to subject all parts of the substance to an air current of substantial uniform velocity so that those constituents of the substance varying in weight from others will be deflected toward the various compartments intended therefor.

Other objects and advantages will appear in the following specification, reference being had to the accompanying drawing in which Figure 1 is a side elevation of the improved separating device.

Figure 2 is a central vertical section.

Figure 3 is a cross section taken on the line 3—3 of Figure 2.

Figure 4 is a cross section taken on the line 4—4 of Figure 2.

Figure 5 is a detail section of one of the adjustable air sleeves.

Figure 6 is a detail plan view of the means by which the feed table is oscillated.

Figure 7 is a modification illustrating a reversal in the mode of applying the air current.

As indicated in one of the foregoing brief statements, it is the present intention to adapt the hereindisclosed device to the separation of seeds. This use is to be regarded as illustrative because it is conceivable that the device may be employed for separating materials other than seeds.

The principle of the invention is to direct a current of air against the falling seeds, which in common with the other materials contemplated are generally known as the falling substance, thus to deflect or divert the seeds of various kinds from the path of falling movement according to their weights or densities and catch them in separating compartments placed near the bottom of the device. To these ends the device comprises a feed hopper 1 which is loaded with the seeds to be separated. The seeds may be charged into the hopper continuously. The hopper comprises the inverted frustum of a hollow cone, the opening 2 of which is the place of discharge of the seeds on to the conical top 3 of a circular feed table 4.

This table has a depending rim 5 over which the seeds are caused to fall or flow by gravity in tubular form. That is to say, seeds falling over the rim 5 at all peripheral points of the feed table 4 will produce a circular sheet of seeds which may be understood as comprising a hollow cylindrical wall.

This fall or flow of seeds occurs within a casing 6 which is perforated at 7 for the admission of air. The perforations may be arranged on any preferred order and may extend as far down the casing as may be required. The band of perforations is annular. In practice there will be so many of the perforations that although each of these would be instrumental in producing a separate stream of air yet the combined effect against the tubular wall of falling seeds is that of a single current of air.

The thickness of the wall of falling seeds is subject to regulation by adjusting the feed table in respect to the tapering feed throat or annulus 8 of the casing 6. It follows that by moving the feed table 4 up or down in respect to this throat that the available space will be decreased or increased so as to let varying volumes of seeds through. Both the rim 5 and the throat 8 may be corrugated, thus to facilitate the flow of seeds when the feed sleeve 9 of the table 4 is oscillated by means of an eccentric pin 10.

This pin is carried by a suitably driven shaft 11. It occupies and works in a slot 12 (Fig. 6) at the outer end of an arm 13 which is attached to the sleeve 9. The sleeve 9 in turn, is attached to the feed table 4. A brace 14, which may be cylindrical, supports the hopper 1 in fixed relationship to the casing 6.

Other braces 15 support the upper end of a central hollow shaft 16. This shaft passes through the sleeve 9 and terminates at a step bearing 17 near the bottom of the casing 6. The shaft is fixed and the sleeve 9 as well as its carried feed table 4 are adjustable in respect thereto. The foregoing step bearing 17 is situated in the intake tube 18 of a fan casing in which a suction fan 20 is revolved by means of a belt (not shown) applied to a pulley 21 on the fan shaft 22.

An outlet 23 of the fan casing 19 appears on the outside of the casing 6. It is here that the lighter seeds are discharged, and the place into which they are discharged is immaterial. The outgoing current of air may be piped to a suitable receiver.

Thus far it will be understood that the action of the fan 20 is to set up a current of air in the casing 6. The air flows in at the perforations 7 where it is directed at substantially right angles against the tubular wall of falling seeds immediately to the inside. Some of the seeds are heavier than others, and it follows that the lightest will be diverted to the center of the casing 6 whence they are drawn into the fan casing 19 and discharged at the outlet 23.

The manner and means by which the heavier seeds are separated involve the following structure: Situated an appropriate distance above the fan casing 19 is a sloping bottom 24, the lowest point of which has access to a discharge spout 25. This spout has a door 26 hinged at the top so that it will tend to close. The volume of seed behind it will cause the door to open but otherwise the arrangement of the door will prevent an influx of air at the spout 25. The heavier seeds, being least deflected by the current of air will fall upon the bottom 24 and be discharged at the spout 25.

Mounted upon the bottom 24, or arranged about the axis of the casing in some other preferred way, is a pan 27 which has access to a second discharge spout 28. This spout has a hinged door 29 which operates on a principle identical with that of the door 26. The purpose of the pan 27 is to catch lighter seeds, in other words, those that are deflected farther toward the center of the casing 6 by the air current.

A central receiver 30 has a depending sleeve 31 which feeds and works in the intake tube 18 of the fan casing 19. This receiver is the frustum of a hollow cone and its purpose is that of a hopper by which the lightest seeds are received prior to their entrance into the fan casing 19.

Generally speaking, the bottom 24, pan 27 and receiver 30 constitute a plurality of compartments into which seeds of varying weights are diverted or directed by the air current set up through the casing by the fan 20. These compartments are concentric, or substantially so. They are so placed as to catch the seeds in the successively more sharply deflected walls of seeds. On the foregoing principle, a greater or lesser number of compartments may be employed, this depending on the number of constituents to be separated from the substance.

It is not always possible to regulate the speed of the fan 20 for the creation of an air current of the desired velocity. Although this velocity will always be substantially uniform, the regulation of its effect upon the seeds is accomplished by a set of adjustable pair of sleeves 32, 33, 34 and 35. These have tubular centers 36 by which they are slidably assembled on the hollow shaft 16. The upper sleeve 32 is capped at 37 but the others have successively smaller flared flanges 38 which are intended for the purpose of providing the lighter grain from bouncing back into the heavier grain when striking the sides of the air sleeves.

Fins 39 (Fig. 5) not only provide spacer between the air sleeves and their tubular centers 36 but also serve to prevent the central stream of air from swirling. Although the sleeves of the foregoing set are spaced apart in the direction of the axis of the casing 6 they nevertheless define a tubular guide or central discharge conduit for the air current.

These sleeves are supported and adjusted by means which in each case is as follows:—A double hook 40 (Fig. 5) projects from the sides of the hollow shaft 16 which is slotted at 41 for the purpose. The central part of the hook is attached to a flexible element 42 which passes up the shaft 16 and over one or more guide pulleys (not shown) to a place where the element is secured and from which it can be let up or down to adjust the respective sleeves accordingly. The hook engages the nether edge of the tubular center 36.

A similar form of suspension means is used for the feed table 4. The shaft 16 is similarly slotted at the place where the respective double hook 43 appears, but these slots (not shown) are wider than the others in order to accommodate the oscillation of the feed table.

A canvas or other cover 46 may be used in conjunction with the casing 6. This cover will be used to concentrate the air blast on certain portions of the falling grain. For example, should it be desired to concentrate the air blast on the upper portion of the falling grain the cover would be placed around the lower perforations. A greater volume of air would thus be discharged against the grain. This cover may be applied in any suitable way and it may also be as long as practice may prove best. According to the showing, the cover is carried by a flexible band 47 which is applied to the casing and by virtue of its flexibility will hold the cover 46 where placed.

Instead of employing a suction fan for the creation of a current of air through the casing, the latter may be sealed in a housing 44 (Fig. 7) which by means of a conduit 45 is in communication with a source of compressed air. This housing would have to cover only the perforations 7 and since the housing is filled with air under pressure it follows that air will be discharged into the casing 6 at all circumferential points. The outlet 23 of the former fan casing 19 now becomes the outlet of the casing 6.

The operation is readily understood. Grain to be separated is dumped into the hopper 1 whence it escapes at the discharge opening 2 onto the conical top of the circular feed table 4. Here it is spread out in all directions and falls over the edge of the depending rim 5 in the form of a tubular or cylindrical wall of grain.

This wall appears on the inside of the casing 6 immeriately over the ends of the perforations 7 through which air is drawn by the operation of the suction fan 20. Assuming that the grain contains seeds of different weights or densities, it follows at once that the current of air blowing toward the intake tube 18 of the fan casing 19 will have varying effects.

Those seeds that are heaviest will drop most nearly straight and fall onto the bottom 24 which, for convenience, is known as one of a plurality of seed compartments. Seeds somewhat lighter will be deflected more and drop into the pan 27 which constitutes another compartment, while seeds still lighter will be deflected more and enter the central receiver 30.

It is thus easy to visualize the separation of the seeds into a plurality of strata, each tapering or inclining more sharply to the axial center. By placing the separate seed compartments at the proper points the seeds in these strata will be intercepted and carried off to a point of discharge.

The sleeves 32 and 35 are adjustable so that there will be an even suction in all parts of the inside of the casing 6. These sleeves are also adjustable in order to regulate the amount of air drawn in through the perforations. It is conceivable that by lowering all of the sleeves so that each contacts the other the inflow of air may be shut off. As the grain falls over the depending rim 5 the table 4 is made to oscillate by means of the pin 10 (Fig. 1) and arm 13 so that any grain tending to stick around the periphery will be worked out. In either the instance of the form of the invention in Figure 2 or Figure 7 the current of air is made to strike the hollow cylinder or wall of falling grain at approximately right angles.

While the construction and arrangement of the improved separating device is that of a generally preferred form, obviously modifications and changes may be made without departing from the spirit of the invention or the scope of the claims.

I claim:

1. In a separating device, a circular feed table to receive a substance and from the rim of which table the substance flows in tubular form, a central feed hopper to discharge onto the table, a casing in which the flow occurs, and a tapering annulus above the rim of the table and means to adjust the feed table relatively to the annulus to vary the thickness of the wall of flowing substance.

2. In a separating device, a sleeve being part of an air discharge conduit, a tubular center for the sleeve, means engaging said center for the support of the sleeve, a hollow shaft upon which the center is guided having a slot occupied by said means, and a flexible element attached to said means and passing through the shaft for the adjustment of the sleeve in relationship to the shaft.

3. In a separating device, a circular feed table to receive a substance and from the rim of which table the substance flows in tubular form, a central feed hopper to discharge onto the table, a casing in which the flow occurs, a tapering annulus about the rim of the table, means to adjust the feed table relatively to the annulus to vary the thickness of the wall of flowing substance, and means for oscillating the feed table about its axis to facilitate the flow of the substance.

ROY E. HEDBERG.